US012011923B2

(12) United States Patent
Keller et al.

(10) Patent No.: US 12,011,923 B2
(45) Date of Patent: Jun. 18, 2024

(54) SYSTEM AND METHOD FOR GENERATING PRE-FIRE PULSES DURING A PRINTING PAUSE

(71) Applicant: Canon Production Printing Holding B.V., Venlo (NL)

(72) Inventors: Markus Keller, Schrobenhausen (DE); Martin Wilhelm, Maitenbeth (DE); Martin Stockmar, Poing (DE); Florian Hitzlsperger, Poing (DE); Christoph Rummelsberger, Poing (DE)

(73) Assignee: Canon Production Printing Hodling B.V., Venlo (NL)

( * ) Notice: Subject to any disclaimer, the term of this patent is extended or adjusted under 35 U.S.C. 154(b) by 154 days.

(21) Appl. No.: 17/524,224

(22) Filed: Nov. 11, 2021

(65) Prior Publication Data

US 2022/0143974 A1 May 12, 2022

(30) Foreign Application Priority Data

Nov. 12, 2020 (DE) ......................... 102020129905.2

(51) Int. Cl.
*B41J 2/045* (2006.01)

(52) U.S. Cl.
CPC ....... *B41J 2/04573* (2013.01); *B41J 2/04581* (2013.01); *B41J 2/04596* (2013.01); *B41J 2/04598* (2013.01)

(58) Field of Classification Search
CPC ..... B41J 2/04596; B41J 11/42; B41J 2/04573
See application file for complete search history.

(56) References Cited

U.S. PATENT DOCUMENTS

| | | | | |
|---|---|---|---|---|
| 2007/0291060 | A1* | 12/2007 | Aruga | B41J 29/393 347/12 |
| 2009/0160887 | A1 | 6/2009 | Hamazaki et al. | |
| 2012/0081446 | A1* | 4/2012 | Usuda | B41J 2/16585 283/93 |
| 2014/0055512 | A1* | 2/2014 | Buschmann | B41J 2/04596 347/9 |
| 2015/0174898 | A1* | 6/2015 | Komada | B41J 2/04596 347/14 |

FOREIGN PATENT DOCUMENTS

| | | | |
|---|---|---|---|
| DE | 102017110813 A1 | | 11/2018 |
| JP | 2009196250 A | * | 9/2009 |

OTHER PUBLICATIONS

German Action dated Jul. 12, 2021, Application No. 10 2020 129 905.2.

* cited by examiner

*Primary Examiner* — Shelby L Fidler
(74) *Attorney, Agent, or Firm* — The Webb Law Firm

(57) ABSTRACT

A controller for a print head of an inkjet printing device is described that is configured to generate a virtual timing signal during a printing pause of the printing device, and to use the virtual timing signal for the generation of pre-ejection pulses in order to produce a reliable regeneration of the nozzles of the print head during the printing pause.

10 Claims, 2 Drawing Sheets

SYSTEM AND METHOD FOR GENERATING PRE-FIRE PULSES DURING A PRINTING PAUSE

CROSS REFERENCE TO RELATED APPLICATIONS

This patent application claims priority to German Patent Application No. 102020129905.2, filed Nov. 12, 2020, which is incorporated herein by reference in its entirety.

BACKGROUND

Field

The disclosure relates to a controller and a corresponding method for operating an inkjet printing device during a printing pause.

Related Art

Inkjet printing devices may be used for printing to recording media in the form of a web, for example paper. For this purpose, one or more print heads respectively having one or more nozzles are used in order to fire droplets onto the recording medium, and in order to thus generate a desired print image on the recording medium.

The printing device may be configured to stop the advancement of the recording medium in the form of a web for a time-limited printing pause during the printing operation, without a termination of the printing operation thereby being produced. The time-limited printing pause may be used by a user of the printing device to review the print quality of the printing device and/or to remedy technical problems in the pre-processing and/or in the post-processing of the recording medium.

The ink in the one or more print heads of the printing device may be negatively affected by environmental influences during a printing pause, in particular by a relatively high ambient temperature, whereby the print quality of the printing device may be negatively affected after the printing pause has ended.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 1:
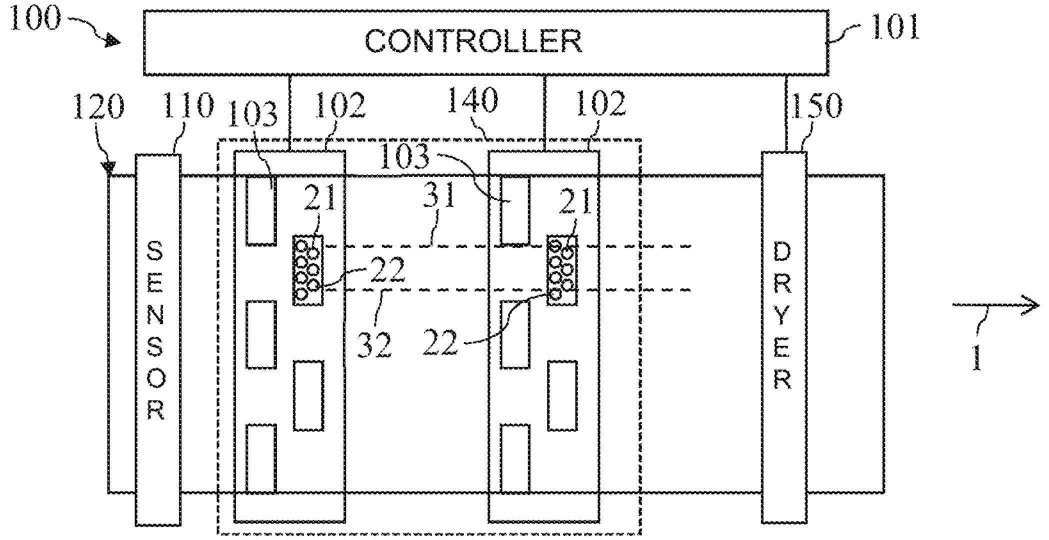

FIG. 1 a block diagram of an example of an inkjet printing device according to an exemplary embodiment.

Figure 2A:
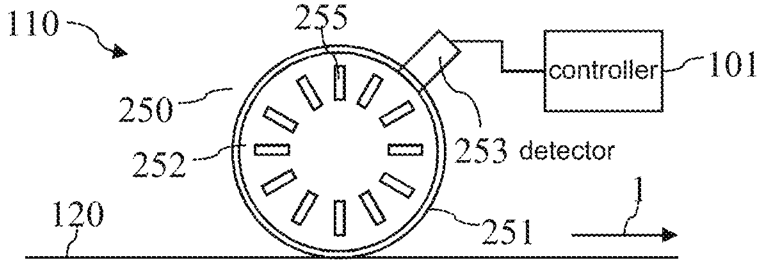

FIG. 2*a* a sensor according to an exemplary embodiment.

Figure 2B:
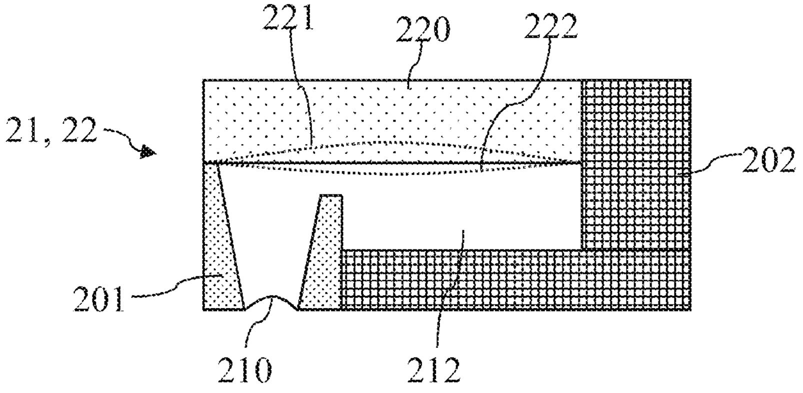

FIG. 2*b* a nozzle according to an exemplary embodiment.

Figure 3:
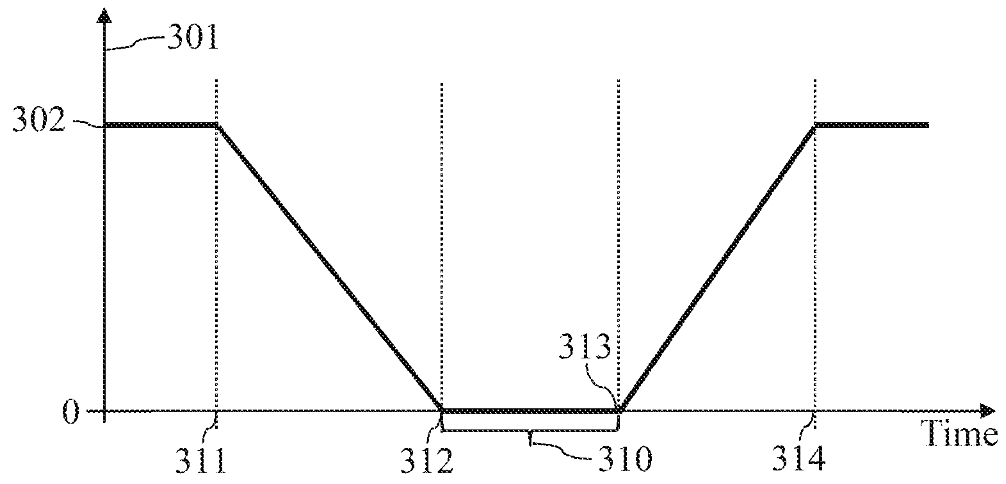

FIG. 3 a plot of a time curve of the transport velocity of a recording medium in the form of a web given a printing pause, according to an exemplary embodiment.

Figure 4:
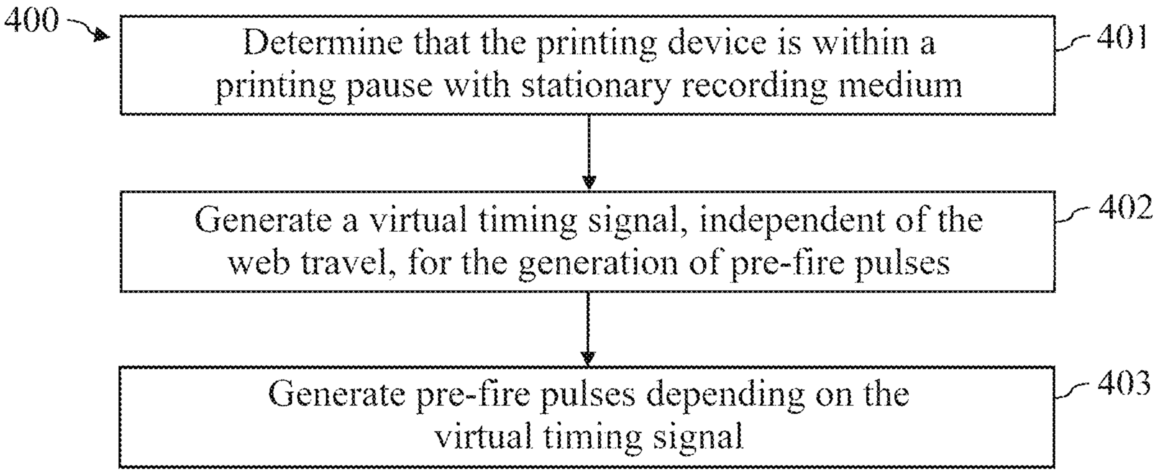

FIG. 4 a flowchart of a method for operating a printing device in conjunction with a printing pause according to an exemplary embodiment.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure. The connections shown in the figures between functional units or other elements can also be implemented as indirect connections, wherein a connection can be wireless or wired. Functional units can be implemented as hardware, software or a combination of hardware and software.

An object of the present disclosure is to efficiently and reliably enabling a consistently high print quality of an inkjet printing device, even following a time-limited printing pause.

According to one aspect of the disclosure, a controller is described for a print head of an inkjet printing device. The print head comprises one or more nozzles that are designed to fire ink droplets onto a recording medium in the form of a web to print a print image. The controller is configured to determine that the printing device is within a time-limited printing pause with a stationary recording medium. Furthermore, the controller is configured to generate, during the printing pause, a virtual timing signal that is independent of the movement of the recording medium and, depending on the virtual timing signal, to produce pre-ejection pulses of the one or more nozzles without ejecting ink.

According to a further aspect of the disclosure, a method is described for operating a print head of an inkjet printing device given a printing pause of said printing device. The print head comprises one or more nozzles that are designed to fire ink droplets onto a recording medium in the form of a web in order to print a print image. The method includes the determination that the printing device is within a time-limited printing pause with a stationary recording medium. The method also includes the generation, during the printing pause, of a virtual timing signal that is independent of the movement of the recording medium, and the production, during the printing pause, of pre-ejection pulses of the one or more nozzles without ejection of ink, depending on the virtual timing signal.

The printing device (printer) 100 depicted in FIG. 1 is designed for printing to a recording medium 120 in the form of a belt or web. The recording medium 120 may be produced from paper, paperboard, cardboard, metal, plastic, textiles, a combination thereof, and/or other materials that are suitable and can be printed to. The recording medium 120 is directed through the print group 140 of the printing device 100 along the transport direction 1, represented by an arrow.

In the depicted example, the print group 140 of the printing device 100 comprises two print bars 102, wherein each print bar 102 may be used for printing with ink of a defined color, for example black, cyan, magenta, and/or yellow, and, if applicable, Magnetic ink character recognition (MICR) ink. Different print bars 102 may be used for printing with respective different inks. Furthermore, the printing device 100 typically comprises at least one fixer or dryer 150 that is configured to fix a print image printed onto the recording medium 120.

A print bar 102 may comprise one or more print heads 103 that are arranged side by side, if applicable in a plurality of rows, in order to print the dots of different columns 31, 32 of a print image onto the recording medium. In the example depicted in FIG. 1, a print bar 102 comprises five print heads 103, wherein each print head 103 prints the dots of a group of columns 31, 32 of a print image onto the recording medium 120.

In the embodiment illustrated in FIG. 1, each print head 103 of the print group 140 comprises a plurality of nozzles 21, 22, wherein each nozzle 21, 22 is configured to fire or eject ink droplets onto the recording medium 120. For example, a print head 103 of the print group 140 may comprise multiple thousands of effectively utilized nozzles 21, 22 that are arranged along a plurality of rows transverse to the transport direction 1 of the recording medium 120. By means of the nozzles 21, 22 of a print head 103 of the print group 140, dots of a line of a print image may be printed onto the recording medium 120 transverse to the transport direction 1, i.e. along the width of the recording medium 120.

In an exemplary embodiment, the printing device 100 also comprises a controller 101 (e.g. activation hardware and/or a processor) that is configured to control the actuators of the individual nozzles 21, 22 of the individual print heads 103 of the print group 140 in order to apply the print image onto the recording medium 120 depending on print data. The print data may respectively indicate whether an ink ejection should take place or not, and if applicable what ink quantity should be ejected, for each nozzle 21, 22, i.e. for each column 31, 32 of the print image, and for each line of the print image. In an exemplary embodiment, the controller 101 includes processing circuitry that is configured to perform one or more functions and/or operations of the controller 101, including controlling the actuators of the individual nozzles and/or controlling one or more other operations of the printing device 100.

The print group 140 of the printing device 100 thus comprises at least one print bar 102 having K nozzles 21, 22 that may be activated with a defined line timing in order to print a line traveling transverse to the transport direction 1 of the recording medium 120, with K pixels or K columns 31, 32 of a print image, onto the recording medium 129, for example with K>1000. In the depicted example, the nozzles 21, 22 and/or the print heads 103 are installed immobile or fixed in the printing device 100, and the recording medium 120 is directed past the stationary nozzles 21, 22 and/or print heads 103 with a defined transport velocity.

In an exemplary embodiment, the printing device 100 also comprises a rotary encoder or sensor 110 that is configured to provide a basic timing signal for determining the line signal or a line timing for the activation of the nozzles 21, 22 of the printing device 100. The sensor 110 may also be referred to as an encoder. As depicted in FIG. 2*a*, the rotary encoder 110 comprises an encoder roller 251 that is driven by the recording medium 120 moving in the transport direction 1, and that moves with said recording medium 120, in particular moves without slippage. One revolution of the encoder roller 251 thus corresponds to a defined travel d of the recording medium 120. In an exemplary embodiment, the encoder or sensor 110 includes processing circuitry that is configured to perform one or more functions and/or operations of the encoder or sensor 110.

The rotary encoder 110 (e.g. an incremental encoder) may moreover comprise at least one rotary encoder 250 that, for example, has a disc 252 provided with slits 255, which disc 252 is located between at least one light emitting diode 254 and at least one photodetector 253. Two photodetectors 253 arranged slightly offset are preferably present that, upon rotation of the disc 252, emit two signals A and B that are electrically phase-shifted, preferably by 90°, and are preferably rectangular. From these two signals, an AB counter may determine the rotation direction of the disc 252 and count the edge changes of the electrical signals of the photodetectors 253. In sum, per slit 255, up to four timing pulses may be generated that, for example, may be referred to as basic cycles. A sequence of basic cycles may thus be generated by a rotary encoder 110. The distance between two adjacent basic cycles thereby corresponds to a defined, traveled basic cycle travel $d_g$ of the recording medium 120. A sequence of basic cycles may consequently be generated by the exemplary sensor 110 per revolution of the encoder roller 251. The sequence of basic cycles may be referred to as a basic cycle signal.

The number of lines that is printed on a defined travel of the recording medium 120 in the transport direction 1 depends on the dot resolution in the transport direction 1. Depending on the dot resolution, a line signal with a sequence of line timing pulses may be generated on the basis of a sequence of basic cycles so that the distance between two line timing pulses corresponds to the line spacing predetermined by the dot resolution.

In an exemplary embodiment, the sensor 110 is configured to generate a line signal depending on the transport velocity, or a line timing dependent on the transport velocity. This enables an undistorted print image to be printed on the recording medium 120 even given variable transport velocity, for example given a reduction of the transport velocity in preparation for a printing pause, or upon increasing the transport velocity following a printing pause.

FIG. 2*b* shows an example of a design of a nozzle 21, 22 of a print head 103. The nozzle 21, 22 comprises walls 202 which, together with an actuator 220 and a nozzle opening 201, form a container or a chamber 212 for receiving ink. An ink droplet may be fired or ejected onto the recording medium 120 via the nozzle opening 201 of the nozzle 21, 22. The ink forms what is known as a meniscus 210 at the nozzle opening 201. Furthermore, the nozzle 21, 22 comprises an actuator 220, for example a piezoelectric element, which is configured to vary the volume of the chamber 212 to receive the ink, or to vary the pressure in the chamber 212 of the nozzle 21, 22. In particular, the volume of the chamber 212 may be reduced by the actuator 220 as a result of a deflection 222, and thus the pressure in the chamber 212 may be increased. An ink droplet may thus be ejected from the nozzle 21, 22 via the nozzle opening 201. FIG. 2*a* shows a corresponding deflection 222 of the actuator 220. Moreover, the volume of the chamber 212 may be increased by the actuator 220 (see deflection 221) in order to draw new ink into the container or into the chamber 212 via an inlet (not shown in FIG. 2*b*).

Via a deflection 221, 222 of the actuator 220, the ink within the nozzle 21, 22 may thus be moved and the chamber 212 may be placed under pressure. A defined movement of the actuator 220 thereby produces a corresponding defined movement of the ink or of the meniscus 210. The defined movement of the actuator 220 is typically produced via a corresponding defined waveform or a corresponding defined pulse of an activation signal of the actuator 220. In particular, via a fire pulse (which is also referred to as an ejection pulse) to activate the actuator 220, the effect may be produced that the nozzle 21, 22 ejects an ink droplet via the nozzle opening 201. Different ink droplets may be ejected via different activation signals or ejection pulses at the actuator 220. In particular, ink droplets with different droplet size (for example 5 pl, 7 pl, or 12 pl) may thus be ejected. Furthermore, via a pre-fire pulse (which is also referred to as a pre-ejection pulse) for activation of the actuator 220, the effect may be produced that, although the nozzle 21, 22 produces a movement of the ink and an oscillation of the meniscus 210, no ink droplet is thereby ejected via the nozzle opening 201.

If a nozzle 21, 22 is not activated in order to produce an ink ejection for a relatively long period of time, this may lead to the situation that the viscosity of the ink in the chamber 212 of the nozzle 21, 22 increases, whereby a subsequent ink ejection—and therefore the print quality of the printing device 100—may be negatively affected. Pre-ejection pulses may be used to reduce the viscosity of the ink in the chamber 212 of a nozzle 21, 22 in preparation for an ink ejection, and to increase the print quality as a result of this.

As has already been presented above, the printing device 100 may be designed to enable a time-limited printing pause without thereby needing to terminate a printing process. For example, a printing pause with a chronological duration of up to one minute may be enabled. The printing pause may be used by a user of the printing device 100 to review the print quality of said printing device 100, and/or to remedy a technical problem in the environment of said printing device 100. FIG. 3 shows an example of a time curve of the transport velocity 301 of the recording medium 120 within the framework of a printing pause. The recording medium 120 may be moved with an operating transport velocity 302 during the running printing operation. At a first point in time 311, the transport velocity 302 may be reduced, starting from the operating transport velocity 302, until the recording medium 120 comes to a standstill at a second point in time 312. The print image may continue to be printed during the velocity ramp between the first and second point in time 311, 312, wherein the line timing varies corresponding to the transport velocity 301.

In the pause time period 310 between the second point in time 312 and the third point in time 313, a standstill of the recording medium 120 may be produced. Following the printing pause, i.e. following the pause time period 310, the transport velocity 301 may then be increased again until the operating transport velocity 302 is achieved again at the fourth point in time 314. The print image may thereby also be printed during the velocity ramp between the third point in time 313 and the fourth point in time 314.

The stopping of the recording medium 120 above a typically warm recording medium 120 may lead to a relatively rapid evaporation of the water fraction in the ink in the one or more nozzles 21, 22 of the one or more print heads 103 of the printing device 100, and as a result of this to nozzle failures following a printing pause. As a countermeasure, the actuator 220, in particular the piezoelectric element, of a nozzle 21, 22 or of a print head 103 may be induced to generate one or more pre-ejection or pre-fire pulses in order to maintain the viscosity of the ink.

In an exemplary embodiment, the controller 101 of the printing device 100 may be configured to generate pre-ejection pulses depending on the line timing, or on the timing or line signal. In a printing pause, within the scope of a regulation, the effect may be produced that the recording medium 120 is kept in tension. Due to the control behavior of the drive motors of the transport unit for transporting the recording medium 120, relatively small forward-and-back movement of the recording medium 120 may arise during the printing pause. The forward-and-back movement of the recording medium 120 may be referred to as "littering" of the recording medium 120. This "littering" of the recording medium 120 may lead to the situation that the sensor 110 generates a random basic cycle signal which leads to a random generation of ejection pulses.

The random generation of ejection pulses may in particular depend on how well and/or how uniformly the tension of the recording medium 120 may be held or adjusted during the printing pause. Given an optimal adjustment of the tension, the "littering" of the recording medium 120 may be entirely avoided, so that no basic cycle signal is generated, and thus also no ejection pulse.

Ejection pulses are also often generated only in preparation for a dot to be printed by the respective nozzle 21, 22. This may lead to the situation that, for a nozzle 21, 22 that does not print a dot directly following the printing pause, no pre-ejection pulses are produced during the printing pause.

Thus, it is often not possible to reliably generate pre-ejection pulses during a printing pause, on the basis of the basic cycle signal generated by the sensor 110, in order to avoid a drying out of the nozzles 21, 22 of the printing device 100. The controller 101 of the printing device 100, in particular a control module of a print bar 102, may be configured to determine that the printing device 100 is within a printing pause. Furthermore, the controller 101 may be configured to generate a virtual timing signal during the printing pause or during the pause time period 310, in particular independently of the sensor 110. The virtual timing signal may, for example, correspond to the line timing if the recording medium 120 exhibits the operating transport velocity 302. The virtual timing signal may be generated by means of a digital clock—in particular by means of an oscillator—of the controller 101, for example.

In an exemplary embodiment, the controller 101 may also be configured to generate, during the printing pause, pre-ejection pulses depending on the virtual timing signal. For example, pre-ejection pulses may be generated periodically with a defined frequency in the individual nozzles 21, 22.

A virtual print timing, i.e. a virtual timing signal, may thus be generated as of a standstill of the recording medium 120. The virtual print timing may thereby be generated separately by a central controller 101 or in every single print bar 102. Y respective pre-fire pulses—for example Y between 1 and 4, in particular Y=1—may then be fired at every X-th virtual timing signal, for example X between 1000 and 5000, in particular X=4000. As a result of this, pre-fire pulses may be generated in a defined manner in a printing pause, independently of the sensor 110.

FIG. 4 shows a flowchart of an example of a (possibly computer-implemented) method 400 for operating a print head 103 of an inkjet printing device 100 given a printing pause of the printing device 100. The print head 103 comprises one or more, in particular K, nozzles 21, 22 that are designed to fire ink droplets onto a recording medium 120 in the form of a web in order to print a print image. Each nozzle 21, 22 may thereby be associated, in a one-to-one relationship, with precisely one column 31, 32 of the print image to be printed. The printing device 100 may be designed such that the recording medium 120 is directed past the stationary print head 103. Depending on a line timing, lines of dots may then be printed on the recording medium 120 during the printing operation.

The method 400 includes the determination 401 that the printing device 100 is within a time-limited printing pause with a stationary recording medium 120. The printing pause may be designed such that print data for a print image whose printing is or has been interrupted by the printing pause continues to be stored in the printing device 100 so that the printing of the print image may be continued, without interruption, after the end of the printing pause and/or after resumption of the printing operation.

Furthermore, the method 400 includes the generation 402, during the printing pause, of a virtual timing signal independently of the movement of the recording medium 120. In particular, the virtual timing signal may be generated independently of the sensor or of the encoder 110 of the printing device 100.

The method 400 also includes the production 403, during the printing pause, of pre-ejection pulses of the one or more nozzles 21,22 without ejection of ink, depending on the virtual timing signal. A regeneration of the ink of the nozzles 21, 22 of the print head 103 may be efficiently produced via the use of a virtual timing signal to time the pre-ejection pulses during a printing pause, in order to enable a consistently high print quality even following the printing pause.

In this document, a controller 101 is also described for a print head 103 (or for a print bar 102) of an inkjet printing device 100. The print head 103 comprises one or more nozzles 21, 22, in particular a plurality of nozzles 21, 22, that are designed to fire ink droplets onto a recording medium 120 in the form of a web in order to print a print image.

In an exemplary embodiment, the controller 101 may be configured to determine that the printing device 100 is within a time-limited printing pause with a stationary recording medium 120. In particular, it may be detected that a printing pause mode has been activated by a user, and that the transport velocity 301 of the recording medium 120 has thereupon been reduced to zero. The printing device 100 may then be held in the printing pause for a limited pause duration 310, for example of 3 minutes or less, in particular of 2 minutes or less, before the printing operation is continued following the printing pause.

Furthermore, the controller 101 is configured to generate, during the printing pause, a virtual timing signal that is independent of the movement of the recording medium 120, in particular of the transport velocity of the recording medium 120. The virtual timing signal may, for example, be generated by means of an oscillator and/or by means of a frequency generator. In particular, the virtual timing signal may be generated independently of the basic cycle signal of a sensor 110 of the printing device 100.

In an exemplary embodiment, the controller 101 may also be configured to produce, during the printing pause, pre-ejection pulses of the one or more nozzles 21, 22 without ejection of ink, depending on the virtual timing signal. In this document, the pre-ejection pulses are also referred to as pre-fire pulses. Pre-ejection pulses for regeneration of the one or more nozzles 21, 22 may thus be generated during the printing pause.

A controller 101 for a print head 103 of an inkjet printing device 100 is thus described, which controller 101 is configured to use a virtual timing signal to generate and produce pre-ejection pulses during a printing pause of the printing device 100 in order to produce a reliable regeneration of the nozzles 21, 22 of the print head 103 during the printing pause.

The controller 101 may be configured to periodically produce a respective set of one or more pre-ejection pulses of the one or more nozzles 21, 22 during the printing pause, depending on the virtual timing signal. A regeneration of the nozzles 21, 22 may be particularly reliably produced during a printing pause via a periodic repetition of pre-ejection pulses.

The print head 103 typically comprises a plurality of nozzles 21, 22 for a corresponding plurality of columns 31, 32 of a print image to be printed, for example K nozzles 21, 22 for K columns 31, 32, with $K>500$ or $K>1000$. The controller 101 may be configured to produce at least one pre-ejection pulse at all nozzles 21, 22 of the print head 103 simultaneously, in particular in a common cycle of the virtual timing signal. A particularly reliable regeneration of the nozzles 21, 22 may thus be produced.

The controller 101 may be configured to frequently produce pre-ejection pulses of the one or more nozzles 21, 22 during the printing pause such that the print quality of the printing device 100 is not significantly negatively affected by the printing pause. The number and/or frequency of pre-ejection pulses required for this may be determined experimentally.

As has already been presented above, the printing device 100 typically comprises a sensor 110 that is configured to generate a basic cycle signal depending on the transport velocity 301 of the recording medium 120. The basic cycle signal may thus be dependent on the transport velocity 301 of the recording medium 120.

In an exemplary embodiment, the controller 101 may be configured to generate a line timing on the basis of the basic cycle signal during the printing operation of the printing device 100 with a moving recording medium 120. Depending on the line timing, ejection pulses of the one or more nozzles 21, 22 may then be produced with ejection of ink to print a print image, and/or pre-ejection pulses of the one or more nozzles 21, 22 may be produced without ejection of ink, in particular for regeneration. During the printing operation of the printing device 100, a line timing depending on the transport velocity 301 of the recording medium 120 may thus be generated in order to produce ejection pulses in order to print dots in different lines of a print image, and/or in order to produce pre-ejection pulses for regeneration of the nozzles 21, 22. Print images may thus be printed with high print quality. On the other hand, during the printing pause a virtual timing signal for timing of the pre-ejection pulses may be used in order to have the effect that the print head 103 survives the printing pause without a negative effect on the nozzles 21, 22, and thus a high print quality may continue to be provided following the printing pause.

In an exemplary embodiment, the controller 101 may be configured to have the effect that the transport velocity 301 of the recording medium 120 is reduced along a ramp, in particular to zero, starting from an operating transport velocity 302, in preparation for the printing pause. Furthermore, the controller 101 may be configured to determine that the printing device 100 is within a time-limited printing pause, with a stationary recording medium 120, if it is detected that the transport velocity 301 of the recording medium 120 is less than or equal to a predefined velocity threshold, and/or if it is detected that a printing pause mode has been activated by a user. A printing pause may thus be reliably detected, and the generation of the virtual timing signal may be started.

The controller 101 may be configured to have the effect that, following the printing pause, the transport velocity 301 of the recording medium 120 is accelerated or increased, in particular starting from zero, along a ramp up to the operating transport velocity 302. Furthermore, the controller 101 may be configured to have the effect that a printing process of a print image that has been interrupted due to the printing pause, in particular without a visible interruption of the print image on the recording medium 120, is continued. Alternatively or additionally, the controller 101 may be configured to determine that the time-limited printing pause has ended and/or that the printing device 100 is again within the printing operation if it is detected that the transport velocity 301 of the recording medium 120 is greater than the predefined velocity threshold, and/or if it is detected that the printing pause mode has been deactivated by a user. A printing pause may thus be reliably enabled without losses in the print quality.

Furthermore, in this document a printing device 100 is described that comprises the controller 101 described in this document.

A printing pause of a printing device 100 may be efficiently and reliably provided, without data loss and without losses in the print quality, via the measures described in this document. The described measures also enable the duration 310 of a printing pause to be increased.

To enable those skilled in the art to better understand the solution of the present disclosure, the technical solution in the embodiments of the present disclosure is described clearly and completely below in conjunction with the drawings in the embodiments of the present disclosure. Obviously, the embodiments described are only some, not all, of the embodiments of the present disclosure. All other embodiments obtained by those skilled in the art on the basis of the embodiments in the present disclosure without any creative effort should fall within the scope of protection of the present disclosure.

It should be noted that the terms "first", "second", etc. in the description, claims and abovementioned drawings of the present disclosure are used to distinguish between similar objects, but not necessarily used to describe a specific order or sequence. It should be understood that data used in this way can be interchanged as appropriate so that the embodiments of the present disclosure described here can be implemented in an order other than those shown or described here. In addition, the terms "comprise" and "have" and any variants thereof are intended to cover non-exclusive inclusion. For example, a process, method, system, product or equipment comprising a series of steps or modules or units is not necessarily limited to those steps or modules or units which are clearly listed, but may comprise other steps or modules or units which are not clearly listed or are intrinsic to such processes, methods, products or equipment.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general-purpose computer.

For the purposes of this discussion, the term "processing circuitry" shall be understood to be circuit(s) or processor(s), or a combination thereof. A circuit includes an analog circuit, a digital circuit, data processing circuit, other structural electronic hardware, or a combination thereof. A processor includes a microprocessor, a digital signal processor (DSP), central processor (CPU), application-specific instruction set processor (ASIP), graphics and/or image processor, multi-core processor, or other hardware processor. The processor may be "hard-coded" with instructions to perform corresponding function(s) according to aspects described herein. Alternatively, the processor may access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary embodiments described herein, the memory is any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

REFERENCE LIST

1 transport direction
21, 22 primary or auxiliary nozzle
31, 32 column (of a print image)
100 printing device
101 controller
102 print bar
103 print head
110 sensor/encoder
120 recording medium
140 print group
150 dryer or fixer
201 nozzle opening
202 wall
210 meniscus
212 nozzle chamber 220 actuator
221, 222 deflection (actuator)
250 rotary encoder
251 encoder roller
252 disc
253 photodetector
254 light emitting diode
255 slit
301 transport velocity
302 operating transport velocity
310 pause duration
311-314 points in time
400 method for operating a print head during a printing pause
401-403 method steps

The invention claimed is:

1. A controller for a print head of an inkjet printing device the print head including one or more nozzles configured to fire ink droplets onto a recording medium to print a print image, the controller comprising:

a memory that stores executable instructions;

a processor that is configured to execute the instructions to:

determine that the printing device is within a time-limited printing pause with a stationary recording medium;

generate, during the printing pause, a virtual timing signal independent of a movement of the recording medium; and produce pre-ejection pulses of the one or more nozzles without ejection of ink during the printing pause, based on the virtual timing signal, wherein the print head is installed immobile or fixed such that the print head is a stationary print head in the printing device and the printing device is configured for the recording medium to be directed past the stationary print head with a defined transport velocity;

the printing device comprises a sensor that is configured to generate a basic cycle signal based on the transport velocity of the recording medium, the sensor being formed as a rotary encoder comprising an encoder roller that is driven by the recording medium moving in the transport direction with said recording medium; and during a printing operation of the printing device with a moving recording medium, the processor is further configured to execute the instructions to:

generate a line timing based on the basic cycle signal;

based on the line timing: produce ejection pulses of the one or more nozzles with ejection of ink to print a print image, and/or produce pre-ejection pulses of the one or more nozzles;

reduce the transport velocity of the recording medium, starting from an operating transport velocity in preparation for the printing pause; and determine that the printing device is within a time-limited printing pause with a stationary recording medium in response to a detection that the transport velocity of the recording medium is less than or equal to a predefined velocity threshold, and/or in response to a detection that a printing pause mode has been activated by a user.

2. The controller according to claim 1, wherein the controller comprises an oscillator and/or frequency generator configured to generate the virtual timing signal.

3. The controller according to claim 1, wherein the controller is configured to periodically produce, based on the virtual timing signal, a respective set of one or more pre-ejection pulses of the one or more nozzles during the printing pause.

4. The controller according to claim 1, wherein:

the print head comprises a plurality of nozzles for a corresponding plurality of columns of a print image to be printed; and the controller is configured to simultaneously produce at least one pre-ejection pulse at all nozzles of the print head in a common cycle of the virtual timing signal.

5. The controller according to claim 1, wherein the controller is configured to:

following the printing pause, increase the transport velocity of the recording medium to an operating transport velocity; and continue a printing process of a print image that was interrupted due to the printing pause; and/or determine that the time-limited printing pause has ended, and/or the printing device is within a printing operation, in response to a detection that the transport velocity of the recording medium is greater than a predefined velocity threshold, and/or in response to a detection that a printing pause mode has been deactivated by a user.

6. The controller according to claim 1, wherein the printing pause is configured such that print data for a print image whose printing has been interrupted by the printing pause continues to be stored in the printing device, such that the printing of the print image is continuable without interruption after an end of the printing pause and/or after resumption of the printing operation.

7. The controller according to claim 6, wherein the controller is configured to repeatably produce pre-ejection pulses of the one or more nozzles during the printing pause.

8. A printing system comprising:

a print head including one or more nozzles configured to fire ink droplets onto a recording medium to print a print image; and the controller according to claim 1.

9. A method for operating a print head of an inkjet printing device in a printing pause of the printing device, the print head including one or more nozzles configured to fire ink droplets onto a recording medium, the method comprising:

determining that the printing device is within a time-limited printing pause with a stationary recording medium;

generating, during the printing pause, a virtual timing signal that is independent of a movement of the recording medium; and producing, during the printing pause, pre-ejection pulses of the one or more nozzles without ejection of ink, based on the virtual timing signal, wherein the print head is installed immobile or fixed such that the print head is a stationary print head in the inkjet printing device and the inkjet printing device is configured for the recording medium to be directed past the stationary print head with a defined transport velocity;

the printing device comprises a sensor that is configured to generate a basic cycle signal based on the transport velocity of the recording medium, the sensor being formed as a rotary encoder comprising an encoder roller that is driven by the recording medium moving in the transport direction with said recording medium; and during a printing operation of the printing device with a moving recording medium, the method further comprises:

generating a line timing based on the basic cycle signal;

based on the line timing: producing ejection pulses of the one or more nozzles with ejection of ink to print a print image, and/or producing pre-ejection pulses of the one or more nozzles:

reducing the transport velocity of the recording medium, starting from an operating transport velocity in preparation for the printing pause; and determining that the printing device is within a time-limited printing pause with a stationary recording medium in response to a detection that the transport velocity of the recording medium is less than or equal to a predefined velocity threshold, and/or in response to a detection that a printing pause mode has been activated by a user.

10. A non-transitory computer-readable storage medium with an executable program stored thereon, that when executed, instructs a processor to perform the method of claim 9.

* * * * *